June 23, 1959  N. LEVIN ET AL  2,891,284
METHOD FOR MOLDING OBJECTS OF NON-UNIFORM THICKNESS
Filed June 18, 1954
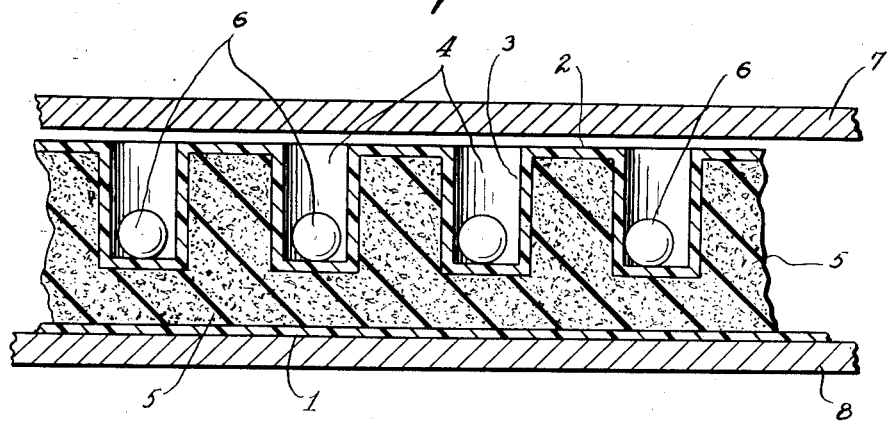
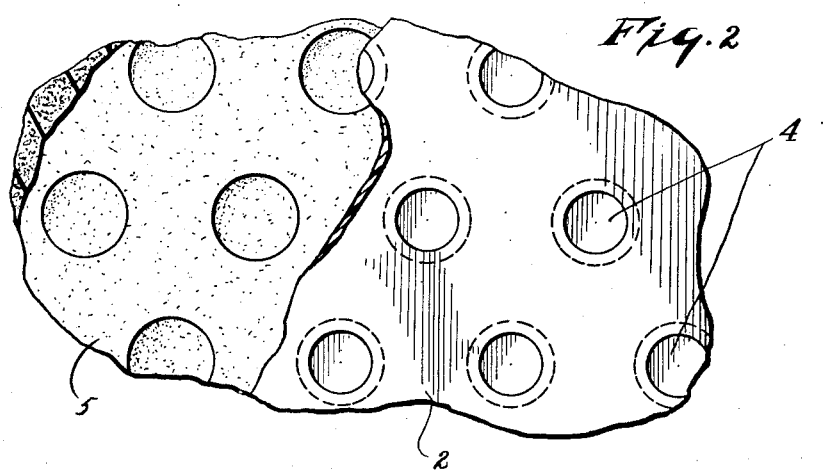
INVENTOR.

United States Patent Office 2,891,284
Patented June 23, 1959

2,891,284

METHOD FOR MOLDING OBJECTS OF NON-UNIFORM THICKNESS

Nathan Levin, Brooklyn, N.Y., and William J. Smythe, Ridgewood, N.J., assignors, by mesne assignments, to Union Carbide Corporation, New York, N.Y., a corporation of New York Application June 18, 1954, Serial No. 437,700

5 Claims. (Cl. 18—53)

This invention relates to a method for molding objects of non-uniform thickness from rubber or plastic materials which are capable of being cured by heat. The invention is of particular importance in the manufacture of cellular objects of the type popularly referred to as "sponge" or "foam."

In the manufacturing of molded cellular objects of uniform thickness from such materials, for example, the use of radio frequency electric current has been increasingly utilized. By placing uncured rubber or latex or plasticized plastic material which has been foamed or properly conditioned for foaming between spaced electrodes, and passing radio frequency current therebetween, a field is created in which electrical energy is absorbed by the material and transformed into heat sufficient to cure the plastic material. Radio frequency curing, as it is known in the art, has the very great advantage that when the object to be cured is of uniform thickness, the absorption of electrical energy occurs simultaneously and substantially uniformly throughout the entire thickness of the object, so that curing proceeds substantially uniformly throughout the entire thickness of the object. Thus, as compared with oven curing, for example, the penetration of heat to the center of the object does not depend on transmission by conduction or otherwise from the outer surfaces. On the contrary, in radio frequency curing, since the electrodes run cold, it is frequently necessary to take precautions to prevent transmission of heat from the object to the electrodes or to any spacing material therebetween, which, if it occurs, tends to retard the curing of the outside surfaces of the object.

Heretofore, however, the use of radio frequency curing has been limited for the most part to objects of uniform thickness, such as sheet stock, for example. It has not been practical to use radio frequency curing for objects of non-uniform, irregular or unsymmetrical thickness because the voltage drop at the regions of greater thickness differs from the voltage drop at the regions of less thickness, resulting in non-uniform absorption of electrical energy and uneven heating. Efforts to correct this difficulty by prolonging the heating cycle until all portions of the object are cured have been unsuccessful because the regions where absorption is more rapid tend to become overcured before the other regions are sufficiently cured.

It is an object of the present invention to provide a method of utilizing radio frequency heating for the curing of cellular objects of non-uniform thickness.

Other objects and advantages of the invention will appear hereinafter.

A preferred embodiment of the invention selected for purposes of illustration is shown in the accompanying drawings, in which, Figure 1 is a vertical section through a mold, and Figure 2 is a top plan view of a portion of a mold.

Referring to the drawing, the section of the mold which has been illustrated is representative of a common type of cored mold which is used in making foamed objects of non-uniform thickness such as cushions, pillows, mattresses, toppers and the like from plasticized vinyl resin, rubber or other suitable plastic materials. In such molds, the bottom plate 1 of the mold may be flat, as shown, while the top plate 2 may be provided with one or more cores 3, here in the form of hollow cylinders extending downwardly from the top plate and forming cavities 4 which are separated from the interior of the mold by the walls of the cores 3. The sides and ends of the mold (not shown) may be of any desired construction. However, while such cored molds may be and customarily are made of metal when used for oven curing, it is advantageous in practicing the present invention to use molds of non-metallic materials which are poor electrical conductors. Preferably a plastic material is selected which has dielectric properties somewhat similar to that of the material which is being treated, but having a sufficiently high melting point to withstand the temperatures generated during the curing process. Polyester type resins have been found well suited for this purpose, for they absorb some energy from the radio frequency field, but they are capable of withstanding curing temperatures.

The material which is to be cured is foamed or otherwise prepared for foaming by methods known in the art, and the desired quantity of material 5 is placed in the mold. Either before or after the material to be cured is placed in the mold, the mold is prepared for uniform curing by placing in each of the cavities 4 where the thickness of the material to be cured is less than the maximum thickness, a material or combination of materials having dielectric properties such that when subjected to a radio frequency field, the material or materials will absorb energy and generate heat within the cavities 4 which is at least equal to the energy absorption and heat generation within the material 5 in the regions immediately adjacent the cavities. Preferably, the rate of absorption of energy by the material in the cavities will be slightly greater than the rate of absorption by the material 5 to compensate for slower absorption of energy by the mold material.

A preferable method of accomplishing the desired result is the use of small, measured quantities of energy absorbing material in the cavities, the amount of which is determined by the capacity of the material to absorb radio frequency energy, by the nature of the material being cured, and by the volume of the cavity. Such energy absorbing material may be either a liquid or a solid having a relatively high dielectric loss factor. A liquid such as water, for example, is a very satisfactory material. The amount of material required for any given case can easily be determined by experiment, but as an example, when curing plasticized vinyl resin compositions, and when using water in the cavities 4 it may be said that approximately 1 ml. of water per 5 cc. of cavity will usually be sufficient. Preferably, for the best results, the water or other liquid required for energy absorption is absorbed into pellets of fibrous or porous material which material is itself either unaffected or only slightly affected by the radio frequency field, and the moistened pellets 6 are placed in the cavities. This has the advantage of distributing the water over a larger portion of the volume of each cavity and thereby producing more even distribution of the generated heat. It will be understood, moreover, that in most cases the absorption of heat is sufficient to vaporize the water or other liquid in the cavity. Any porous or fibrous material which is reasonably unaffected by the radio frequency field and is capable of withstanding curing temperatures can be used as a material for the pellets, as for example, asbestos or a combination of asbestos and a binder.

Alternatively, a solid material may be used to absorb energy from the radio frequency field, but the solid material should be dissolved in a liquid which is unaffected or only slightly affected by the radio frequency field, using proportions which provide a solution having the required degree of absorption of radio frequency energy. Many such solutions of solids in liquids are possible, but one which has been used satisfactorily is a solution of dioctyl sodium sulfo succinate, which is capable of absorbing energy from the radio frequency field, in dioctyl phthalate which is substantially unaffected thereby. A solution formed by dissolving one part of dioctyl sodium sulfo succinate in one part of dioctyl phthalate is satisfactory for use in cases where it may be desired to substantially fill the cavities 4 with the solution.

When the mold has been thus prepared for a curing operation, it is placed between the electrodes 7, 8 and radio frequency electric energy is applied to create a field between the electrodes. Curing is ordinarily completed in a matter of a few seconds.

It will be understood that the term "cure" is used herein in the broad sense of treating a raw material to convert it to a finished state. It includes such terms as "vulcanize" as sometimes applied to the treatment of rubber or "fuse" as sometimes applied to the treatment of plasticized resins.

It will also be understood that the method described herein may be used for molding objects other than cellular objects of non-uniform thickness. For example, it may be used to advantage in the molding of resin bonded sand cores such as commonly used in the metal casting industry.

It will also be understood that the invention may be variously modified and embodied within the scope of the subjoined claims.

We claim as our invention:

1. The method of molding objects of non-uniform thickness from rubber and from plastic material which is capable of being cured by heat which comprises placing a layer of uncured material within a mold having at least one wall provided with at least one hollow core defining a core cavity separated from the interior of the mold by the walls of the hollow core, said hollow core defining a region of lesser thickness within the interior of the mold where the layer of uncured material is of lesser thickness than in other regions within the mold, introducing into said core cavity a measured quantity of material having a capacity to absorb radio frequency electrical energy which is at least equal to that of the uncured material, and exposing said mold to a field of radio frequency electrical energy.

2. The method claimed in claim 1 in which said energy absorbing material is water.

3. The method claimed in claim 1 in which said energy absorbing material is a liquid which has been absorbed into a pellet of fibrous material which is substantially unaffected by radio frequency electrical energy.

4. The method claimed in claim 1 in which said energy absorbing material is a solid which has been dissolved in a liquid which is substantially unaffected by radio frequency energy.

5. The method claimed in claim 1 in which said energy absorbing material is dioctyl sodium sulfo succinate which has been dissolved in dioctyl phthalate.

References Cited in the file of this patent

UNITED STATES PATENTS

| | | |
|---|---|---|
| 2,280,771 | Du Four et al. | Apr. 28, 1942 |
| 2,298,037 | Crandell | Oct. 6, 1942 |
| 2,421,096 | Vogt | May 27, 1947 |
| 2,421,097 | Lakso | May 27, 1947 |
| 2,423,902 | Peterson | July 15, 1947 |
| 2,441,548 | Sperry | May 11, 1948 |
| 2,463,288 | Lequilbn | Mar. 1, 1949 |
| 2,521,808 | Taylor | Sept. 12, 1950 |
| 2,560,783 | Scott | July 17, 1951 |
| 2,564,397 | Duddy | Aug. 14, 1951 |
| 2,604,666 | Bosomworth | July 29, 1952 |
| 2,642,624 | Marvin | June 23, 1953 |